United States Patent Office 3,342,881
Patented Sept. 19, 1967

3,342,881
METHOD FOR THE PREPARATION OF FLUORINE DERIVATIVES OF HALOGENATED HYDROCARBONS
Makoto Sasakura, % Mitsui Bussan & Co., Ltd., 510 W. 6th St., Los Angeles, Calif. 90014, and Kikuji Hirayama, 2373-1 Onoda, Onoda, Yamaguchi Prefecture, Japan
No Drawing. Filed Jan. 14, 1964, Ser. No. 337,522
Claims priority, application Japan, Jan. 22, 1963, 38/2,001
3 Claims. (Cl. 260—653.7)

This invention relates to an improved method for the preparation of fluorine derivatives of halogenated hydrocarbons by reacting halogenated hydrocarbons with anhydrous hydrofluoric acid in a gaseous phase.

Heretofore, there have been proposed various kinds of metal halides as catalysts for the preparation of fluorine derivatives of halogenated hydrocarbons by reacting halogenated hydrocarbons with anhydrous hydrofluoric acid. Such metal halides proposed as the catalysts include the chloride, bromide, iodide and fluoride of metals such as Cu, Ag, Na, Cd, Ca, Zn, Hg, V, Sb, Mn, Fe, Cr, Ni, Co, Al and Pt or the like.

The reaction can proceed in either a liquid phase or a gaseous phase. Antimony halide has been used for a long time as the typical catalyst in the preparation of fluorine derivatives of halogenated hydrocarbons by the liquid phase reaction with considerable advantages in the selectivity of reaction products and the utilization of raw material to be treated but antimony halide has such disadvantages as that the reaction gives a low yield per reaction volume because it needs a long period of reaction time which results in an expensive loss of antimony halide and that the reaction must be carried out in reaction equipment made of metals that have a sufficient resistance to corrosion by antimony halide. In addition, when the liquid phase reaction is applied to the preparation of a compound having a boiling point close to that of anhydrous hydrofluoric acid, large amounts of hydrofluoric acid are lost with the resulting compound.

As described above, various kinds of metal halides are used as a catalyst for the preparation of fluorine derivatives of halogenated hydrocarbons by gaseous phase reaction.

In carrying out such a gaseous phase reaction, however, the catalyst must be substantially converted into an active state at a predetermined temperature in order to carry out the reaction smoothly.

The temperature for activation of the metal halides is seriously affected by their boiling temperatures, sublimation temperatures, the mixing ratio of a metal fluoride to be produced to an original metal halide and, in the event a carrier is used, the adherent state of the metal halides on the carrier. Further, in order to carry out such a gaseous phase reaction, the reaction must be maintained at a critical condition involving troublesome handling factors. In order to overcome such defects and reduce such handling factors, the metal halide catalysts are deposited on a carrier to place them in an active state and to increase their surface area for contact with the reactants. However, it is noted that few methods have been employed capable of satisfactorily carrying out the preparation of fluorine derivatives of halogenated hydrocarbons if the selectivity of reaction product, the life of the catalyst and the industrial use of raw material, particularly of anhydrous hydrofluoric acid, are considered.

There has been proposed, for example, the use of ferric chloride ($FeCl_3$) as a catalyst as described in "Industrial and Engineering Chemistry," Vol. 39, pages 404 to 409, published in 1947. Ferric chloride has a considerable vapor pressure at the reaction temperature of about 300° C. and hence it is lost as a vapor and its catalytic activity is reduced to about two thirds after the reaction proceeds for about eighty hours. Consequently, in such a case, the regeneration of spent catalyst or the addition of fresh catalyst is unavoidable to continue the reaction. This is a serious defect for the catalyst used in the gaseous reaction which is characterized by a continuous operation.

The halogenated hydrocarbons used as the raw material have boiling points different from those of their corresponding fluorine derivatives and therefore the halogenated hydrocarbons can be removed with comparative ease from the reaction mixture of themselves and their fluorine derivatives even if unreacted halogenated hydrocarbons remain in the reaction mixture due to their lower conversion. On the contrary, the anhydrous hydrofluoric acid used as the raw material is converted into fluoric acid and transferred into a liquid phase when the reaction gas mixture is washed, for example, with water for removing hydrochloric gas contained therein and it is relatively difficult and uneconomical to recover hydrofluoric acid in an anhydrous state from the washing liquid. Further, even if the separation of the anhydrous hydrofluoric acid from the reaction gas mixture is tried by condensing the acid, it is difficult to separate all unreacted hydrofluoric acid and a portion of anhydrous hydrofluoric acid may be converted into a dilute hydrofluoric acid with a high possibility of loss when the reaction gas mixture contains a fluorine derivative of halogenated hydrocarbon having a boiling point near that of anhydrous hydrofluoric acid.

Thus, it is important to carry a substitution reaction between fluorine and halogenated hydrocarbons with a high conversion degree of hydrofluoric acid used as a raw material. And also, it is most desirable to produce products to meet demands by using the same catalyst and the same reaction apparatus with controlling of the reaction conditions such as a mol ratio between the raw materials, reaction temperature and charging rate of the raw materials to be used.

An object of this invention is to provide an improved method for the preparation of fluorine derivatives of halogenated hydrocarbons by reacting gaseous halogenated hydrocarbons with anhydrous, gaseous hydrofluoric acid in the presence of a special catalyst by a continuous operation for a long time without decreasing its catalytic action and causing serious damage to the apparatus by corrosion.

Another object of this invention is to provide an improved method for the preparation of fluorine derivatives of halogenated hydrocarbons by reacting gaseous halogenated hydrocarbons with anhydrous, gaseous hydrofluoric acid in the presence of a special catalyst with a high degree of utilization of raw materials, with a high selectivity of desired products and with an easy control of the reaction products. Other objects of this invention will be obvious from the detailed description hereinafter.

In order to achieve the foregoing objects and overcome the defects of the prior art, the inventors now have developed this invention as the results of their investigations.

Generally, this invention resides in a method for the preparation of fluorine derivatives of halogenated hydrocarbons by reacting gaseous halogenated hydrocarcarbons with anhydrous, gaseous hydrofluoric acid in a gaseous phase in the presence of a catalyst selected from the group consisting of a combination of granular, porous substance and metallic iron, and a combination of granular, porous substance carrying an iron compound and metallic iron. Said granular, porous substances used in this invention may be the conventional granular substances having a porosity which are used as the carriers for the catalysts in the conventional gas phase reactions and including, for example, granular active carbon and granular active alumina. Said iron compound to be carried on said granular, porous substances includes, for example, water soluble iron compounds such as iron halides and iron sulphates and water insoluble iron compounds such as iron oxides and iron hydroxides. The granular, porous substances, particularly granular active carbon may be used in their original state but it is preferable to use them after they have been immersed in an aqueous solution of a water soluble iron compound such as ferric chloride and then dried or after they have been mixed with a water soluble iron compound and then the mixture had been agglomerated into a granular form or after they have been mixed with iron and then the mixture was treated with chlorine gas by passing said gas through the mixture at about 300° C. thereby to deposit ferric chloride on the granular, porous substances. The iron compounds to be carried on the granular, porous substances may be varied widely in their amount without limitation but it is preferable to use them in an amount of at least 5% by weight calculated as metallic iron based on the total weight of the catalysts.

The types of the metallic iron which should be incorporated with the granular, porous substances include fine particles, granular particles, a chip or an inner wall of a reaction vessel made of iron as a principal component. They can be used together with the granular, porous substances in the state of a mixture, or a layer or a deposition thereon. It should be understood that the reaction vessel made of iron can be used as the catalytic material.

The halogenated hydrocarbons used in this invention include, for example, $CCl_4$, $C_2Cl_6$, $CHCl_3$, $CCl_3F$ and $CHCl_2F$. Such a halogenated hydrocarbon is mixed with anhydrous hydrofluoric acid in a predetermined proportion and the resulting gas mixture is passed into a reaction vessel containing said metallic iron and a granular, porous substance at a space velocity of 50 to 10,000/hr. at temperatures above 200° C. to cause a halogen substitution reaction between the halogenated hydrocarbon and the anhydrous hydrofluoric acid to produce the fluorine derivative of the halogenated hydrocarbon. In such a reaction, the compositions of the fluorine derivatives can be optionally controlled by the selection of the reaction temperatures and the mixing proportions of the raw materials.

In accordance with the invention, it is preferable to use the anhydrous hydrofluoric acid and the halogenated hydrocarbons in a mol ratio of the former to the latter of from 1 to 6.

In accordance with this invention, fluorine derivatives of halogenated hydrocarbons can be continuously produced for a long time over 3,000 hours without decreasing the activity of the catalyst and deforming the physical structure of the catalyst whereas the catalytic activity of conventional catalysts decrease during the reaction. The conventional catalyst such as ferric chloride ($FeCl_3$) vaporizes at the conventional reaction temperatures and its catalytic activity decreases. On the contrary, in this invention, it is considered that the inner iron wall of the reaction vessel or the metallic iron or the iron compound deposited or laid as in layers on the granular, porous substance reacts with hydrochloric acid and converts into the iron chlorides. The resulting iron chlorides then vaporize and then deposit on the granular, porous substance and act as the catalyst. In such a case, it is also considered that the iron chlorides deposited on the granular, porous substance are small particles and have such physical and chemical properties that are manifested as high catalytic activity. This is proved from the fact that when the reaction is carried out in the same reaction vessel under the same reaction conditions as in this invention but that the reaction vessel is filled with metallic iron alone, it is observed that the fluorine-substitution reaction occurs only in part. If the reaction temperature increases to about 400° C., the fluorine-substitution reaction is accelerated somewhat but the reaction cannot be continued stably as the composition of the reaction product varies depending on the variation of the proportions of the raw materials to be fed into the reaction vessel and the temperature of the catalyst layer varies and the metallic iron is seriously corroded. And this is further proved from the additional fact that when the reaction is carried out under the same reaction conditions as in this invention but that the reaction vessel is made of other material than iron and is filled with granular, porous substance alone, it is observed that the fluorine-substitution reaction does not proceed. Still further, this is proved from the fact that when the reaction is carried out under the same reaction conditions as in this invention for a period of time of about 200 hours with except that the reaction vessel is filled with granular, porous substance with ferric chloride deposited thereon, it is observed that the activity of the catalyst is decreased to a half and that the reaction cannot be carried out with high efficiency unless the catalyst is reactivated.

In accordance with this invention, though, the reaction can proceed smoothly not only under normal atmospheric pressure but also under a pressure of about 10 kg./cm.$^2$, without difficulty.

The reaction temperature is varied depending on the kinds and the productions of the reaction products, preferably within the range of 200° to 400° C. It is desirable, for example, to set the reaction temperature to 200° to 250° C. when monofluoro-derivative of halogenated hydrocarbon is desired as the principal reaction product, and to raise the reaction temperature to 250° to 300° C. when difluoro-derivative of halogenated hydrocarbon is desired as the principal reaction product. Generally, the selectivity of the reaction products in case of the gaseous phase reaction has a tendency to be inferior to that of the liquid phase reaction because the desired products are liable to disproportionate to undesired products at high temperatures. Considering the disproportionation of reaction products which is more liable to occur at high tempreatures, it is noted as an important advantage of this invention that the fluorine-substitution reaction can proceed sufficiently even at such a comparatively low temperature as 200° C. or so.

Though one might anticipate that the reaction vessel would suffer corrosion, only a trace of corrosion was observed on its inner wall in an embodiment of this invention even after it was used over 3,000 hours, with the loss of its weight by less than 1/1000.

This is another important advantage of this invention as compared with the corrosion of iron when the reaction is carried out by using the reaction vessel filled with metallic iron alone.

According to this invention, conventional steel pipe can be used as the reaction vessel for a long period of the reaction time. In such a case, if the reaction vessel contains metallic iron or metals of which the main component is iron together with the granular, porous substance in an amount not impeding the circulation of gas flow, the degree of corrosion of the reaction equipment is greatly reduced.

As illustrated above, the fluorine derivatives of halogenated hydrocarbons can be produced by the mutual catalytic action of the granular, porous substances, particularly active carbon, and highly active ferric chloride which is constantly generated from the inner wall of the reaction vessel made of iron or metallic iron coexistent with the granular, porous substance in the reaction vessel. So, the reaction can be carried out with high selectivity of the reaction products, high utilization of the raw material, maintenance of catalytic activity for a long period of time and ease of controlling the reaction.

The advantages resulting from this invention are summarized as follows:

(1) During the reaction process, the activity of the catalyst does not decrease, so that the synthetic reaction can be continued for a long time without the regeneration of the catalyst or the supplying of additional catalyst.

(2) The degree of utilization of raw materials, particularly anhydrous hydrofluoric acid, is exceptionally high.

(3) It is possible to control the compositions of the reaction products by adjusting the mol ratio of halogenated hydrocarbon to anhydrous hydrofluoric acid and the reaction temperatures.

(4) The fluorine-substitution reaction can be reasonably carried out at such low temperature as 200° C.

(5) The reaction can be carried out under normal atmospheric pressure and also under super atmospheric pressure.

This invention is illustrated by the following examples:

Example 1

A solution was prepared by dissolving 120 grams of anhydrous ferric chloride ($FeCl_3$) in 300 grams of water. 500 grams of the commercially available granular active carbon having size of 4 mm. diameter and 6 mm. length was dipped into said solution and then the resulting mixture was dried at a temperature of 100° C. to prepare a catalyst. The catalyst was charged into a reaction vessel made of iron having a capacity of 1.0 liter. Then, carbon tetrachloride ($CCl_4$) and anhydrous hydrofluoric acid (HF) were passed through the reaction vessel in a mol ratio of anhydrous hydrofluoric acid to carbon tetrachloride of 1.7 under a reaction pressure of 1 kg./cm.$^2$ (absolute), at a temperature of about 260° C. and at a space velocity of 1000/hr. to obtain the results as shown in the following Table 1.

TABLE 1

|  | Reaction Time in hours | | | | | |
| --- | --- | --- | --- | --- | --- | --- |
|  | 10 | 50 | 200 | 1,000 | 2,000 | 3,000 |
| Composition of Produced Gas (Percent): | | | | | | |
| $CClF_3$ | 0.1 | 0.2 | 0.2 | 0.1 | 0.2 | 0.1 |
| $CCl_2F_2$ | 70.0 | 70.8 | 71.1 | 70.5 | 70.8 | 70.4 |
| $CCl_3F$ | 22.5 | 22.0 | 21.0 | 23.0 | 24.2 | 23.0 |
| $CCl_4$ | 7.0 | 7.0 | 7.7 | 6.4 | 4.8 | 6.5 |
| HF Conversion Ratio (Percent) | 95.8 | 96.6 | 96.4 | 96.7 | 98.0 | 96.6 |
| $CCl_4$ Conversion Ratio (Percent) | 93.5 | 93.5 | 93.0 | 94.3 | 96.0 | 95.0 |

In this case, it was observed that the activity and physical state of the catalyst had not visibly changed after use for 3,000 hours.

Example 2

The process of Example 1 was repeated under a reaction of 1 kg./cm$^2$ (absolute) and at a space velcoity of 1000/hr. by using the same catalyst and reaction vessel but that the mol ratio of anhydrous hydrofluoric acid to carbon tetrachloride and the reaction temperature were altered. The results are shown in the following Table 2.

TABLE 2

|  | Mol Ratio of HF to $CCl_4$ | | | |
| --- | --- | --- | --- | --- |
|  | 1.20 | 1.40 | 1.60 | 2.00 |
| Reaction Temperature (° C.) | 200 | 250 | 250 | 300 |
| Composition of Produced Gas (Percent): | | | | |
| $CClF_3$ | 0 | Trace | Trace | 3.0 |
| $CCl_2F_2$ | 25 | 48.2 | 60.0 | 85.5 |
| $CCl_3F$ | 65 | 42.0 | 37.0 | 9.9 |
| $CCl_4$ | 5 | 9.8 | 3.0 | 1.6 |
| HF Conversion Ratio (Percent) | 96.4 | 98.8 | 98.1 | 95.0 |
| $CCl_4$ Conversion Ratio (Percent) | 96.0 | 92.0 | 97.5 | 98.8 |

Example 3

The process of Example 1 was repeated with a mol ratio of anhydrous hydrofluric acid to carbon tetrachloride of 1.7 under a reaction pressure of 1 kg./cm.$^2$ (absolute) at a temperature of 280° C. by using the same catalyst and reaction vessel except that the space velocity was altered. The results are shown in the following Table 3.

TABLE 3

|  | Reaction Time in hours | | | |
| --- | --- | --- | --- | --- |
|  | 50 | 2,000 | 5,000 | 10,000 |
| Composition of Produced Gas (Percent): | | | | |
| $CClF_3$ | 0.3 | 0.1 | Trace | Trace |
| $CCl_2F_2$ | 73.4 | 71.3 | 70.9 | 67.2 |
| $CCl_3F$ | 18.9 | 22.9 | 22.4 | 23.7 |
| $CCl_4$ | 7.4 | 6.0 | 6.7 | 9.1 |
| HF Conversion Ratio (Percent) | 98.0 | 97.6 | 96.6 | 93.3 |
| $CCl_4$ Conversion Ratio (Percent) | 93.3 | 95.0 | 94.2 | 91.3 |

Example 4

The process of Example 1 was repeated by using the same reaction vessel and raw materials under the same reaction conditions except that the catalysts were altered.

Catalyst A was the same active carbon as in Example 1.

Catalyst B was prepared by mixing the same active carbon as in Example 1 with iron scrap and passing chlorine gas through the mixture at a temperature of 200° to 400° C. and eliminating the remaining iron scrap.

Catalyst C was prepared by powdering the same active carbon as in Example 1, mixing the powdered active carbon with iron powder in an amount of 50%, and pelletizing the mixture.

The results are shown in the following Table 4.

TABLE 4

|  | Catalysts | | | | | |
| --- | --- | --- | --- | --- | --- | --- |
|  | A | | B | | C | |
|  | Reaction Time in hours | | | | | |
|  | 10 | 50 | 10 | 50 | 10 | 50 |
| Composition of Produced Gas (Percent): | | | | | | |
| $CClF_3$ | Trace | 0.1 | 0.2 | 0.1 | Trace | 0.2 |
| $CCl_2F_2$ | 21.3 | 70.6 | 71.4 | 72.0 | 53.4 | 72.9 |
| $CCl_3F$ | 69.4 | 22.1 | 21.5 | 20.9 | 41.0 | 21.3 |
| $CCl_4$ | 9.3 | 7.2 | 6.9 | 7.0 | 5.6 | 6.6 |
| HF Conversion Ratio (Percent) | 66.0 | 96.3 | 97.0 | 97.2 | 87.0 | 97.4 |
| $CCl_4$ Conversion Ratio (Percent) | 91.0 | 93.3 | 93.6 | 93.5 | 95.1 | 94.0 |

Example 5

The process of Example 1 was repeated by using the same reaction vessel, the same catalyst and the same reaction conditions except that the mol ratio of anhydrous hydrofluoric acid to chloroform was 2.0 and the reaction temperature was 300° C. to obtain the results that the conversion of anhydrous hydrofluoric acid was 96% and the composition of the produced gas was 12% of $CHF_3$, 71% of $CHClF_2$, 14% of $CHCl_2F$ and 3% of $CHCl_3$.

*Example 6*

The same reaction vessel used in Example 1 was charged with one liter of granular active alumina having a diameter of 3 to 4 mm. and 100 grams of iron scrap were uniformly charged on the active alumina. 70 liters of chlorine gas were passed through the charge in the reaction vessel at a temperature 200° to 350° C. and then carbon tetrachloride and anhydrous hydrofluoric acid were passed through the reaction vessel in a mol ratio of anhydrous hydrofluoric acid to carbon tetrachloride of 2.35 under a reaction pressure of 1 kg./cm.$^2$ (absolute), at a temperature of 330° C. and a space velocity of 1000/hr. to obtain the results that the conversion of anhydrous hydrofluoric acid was 97%, the conversion of carbon tetrachloride was 98% and the composition of the produced gas was 35% of $CClF_3$, 60% of $CCl_2F_2$, 3.8% of $CCl_3F$ and 1.2% of $CCl_4$.

What we claim is:

1. A method for the preparation of fluorine derivatives of halogenated hydrocarbons selected from the group consisting of $CCl_4$, $C_2Cl_6$, $CHCl_3$, $CCl_3F$ and $CHCl_2F$ comprising reacting at least one of said halogenated hydrocarbons with anhydrous hydrofluoric acid in a gaseous phase at a temperature of about from 200 to 400° C. in the presence of a catalyst selected from the group consisting of (1) a composition consisting essentially of metallic iron and a granular porous substance and (2) a composition consisting essentially of metallic iron and a granular porous substance carrying a material selected from the group consisting of iron sulphates, iron oxides and hydroxides, said granular porous substance being selected from the group consisting of granular active carbon and granular active alumina.

2. The method as defined in claim 1, wherein the mol ratio of the anhydrous hydrofluoric acid to the halogenated hydrocarbons is from 1 to 6.

3. A method as defined in claim 1, in which the quantity of said material, calculated as metallic iron, carried by said granular porous substance is 5% of the total weight of the carrier and the material.

References Cited

UNITED STATES PATENTS

| | | | |
|---|---|---|---|
| 2,005,713 | 6/1935 | Holt et al. | 260—653.7 |
| 2,946,827 | 7/1960 | Belf | 260—653.7 |

FOREIGN PATENTS

| | | |
|---|---|---|
| 428,361 | 6/1935 | Great Britain. |

LEON ZITVER, *Primary Examiner.*

DANIEL D. HORWITZ, *Examiner.*